United States Patent [19]
Endo

[11] Patent Number: 5,412,757
[45] Date of Patent: May 2, 1995

[54] FUZZY CONTROL SYSTEM

[75] Inventor: Tsunekazu Endo, Yokohama, Japan

[73] Assignee: Kabushiki Kaisha Toshiba, Kawasaki, Japan

[21] Appl. No.: 798,155

[22] Filed: Nov. 26, 1991

[30] Foreign Application Priority Data

Nov. 28, 1990 [JP] Japan ................... 2-327125
Nov. 28, 1990 [JP] Japan ................... 2-327126

[51] Int. Cl.⁶ .................... G06F 9/44; G06F 15/00
[52] U.S. Cl. .................... 395/61; 395/900; 395/903; 395/906; 364/148
[58] Field of Search .......... 395/906, 900, 51, 61, 395/11, 903; 364/148, 165

[56] References Cited

U.S. PATENT DOCUMENTS

| | | | |
|---|---|---|---|
| 5,012,430 | 4/1991 | Sakurai | 364/513 |
| 5,051,932 | 9/1991 | Inoue et al. | 395/61 |
| 5,175,801 | 12/1992 | Iokibe | 395/61 |
| 5,214,773 | 5/1993 | Endo | 395/61 |
| 5,216,218 | 6/1993 | Sasaki | 219/69.16 |
| 5,245,698 | 9/1993 | Matsunaga | 395/61 |
| 5,267,141 | 11/1993 | Morita et al. | 364/152 |

OTHER PUBLICATIONS

Procyk et al., "A Linguistic Self-Organizing Process Controller," Automatica vol. 15, 1979, 15-30.
Leung et al., "A Fuzzy Knowledge-based System Shell" TENCON 87—System Z-1, vol. 2, Aug. 1987, 20.3.1-20.3.5.
Zadeh, L. A., "Fuzzy Logic," IEEE Computer, Apr. 1988, 83-93.
Bowen et al., "Conflict Resolution in Fuzzy Forward Chaining Production Systems," Proc. AAAI 88, Aug. 1988, 117-121.
Dubois et al., "Processing Fuzzy Temporal Knowledge," IEEE Trans. on Systems, Man, and Cybernetics, Jul./Aug. 1989, 729-744.
Langari et al., "Self Organizing Fuzzy Linguistic Control with Application to Arc Welding," IEEE Intl. Workshop on Intelligent Robots and Systems, Jul. 1990, 1007-1014.
"Fuzzy Control Shell Based on Fuzzy Temporal Reasoning", Proceeding of 3rd IFSA Congress, Tsunekazu Endo, 1989. 8.6, pp. 220-223.

Primary Examiner—Robert W. Downs
Attorney, Agent, or Firm—Banner, Birch, McKie & Beckett

[57] ABSTRACT

Disclosed is a fuzzy control system which calculates a membership function concerning a control value of a to-be-controlled object through a fuzzy inference operation in accordance with an input value from the to-be-controlled object and a control rule, and determines the control value from the membership function to control the to-be-controlled object. This fuzzy control system has a plurality of internal states respectively expressed by a plurality of membership functions in addition to the input value and the control value, determines the state of the to-be-controlled object using a rule for evaluating the input value, alters the internal state by fuzzy inference, stores a decision result as a new internal state, and determines the control value of the to-be-controlled object through fuzzy inference from the new internal state and the input value.

14 Claims, 12 Drawing Sheets

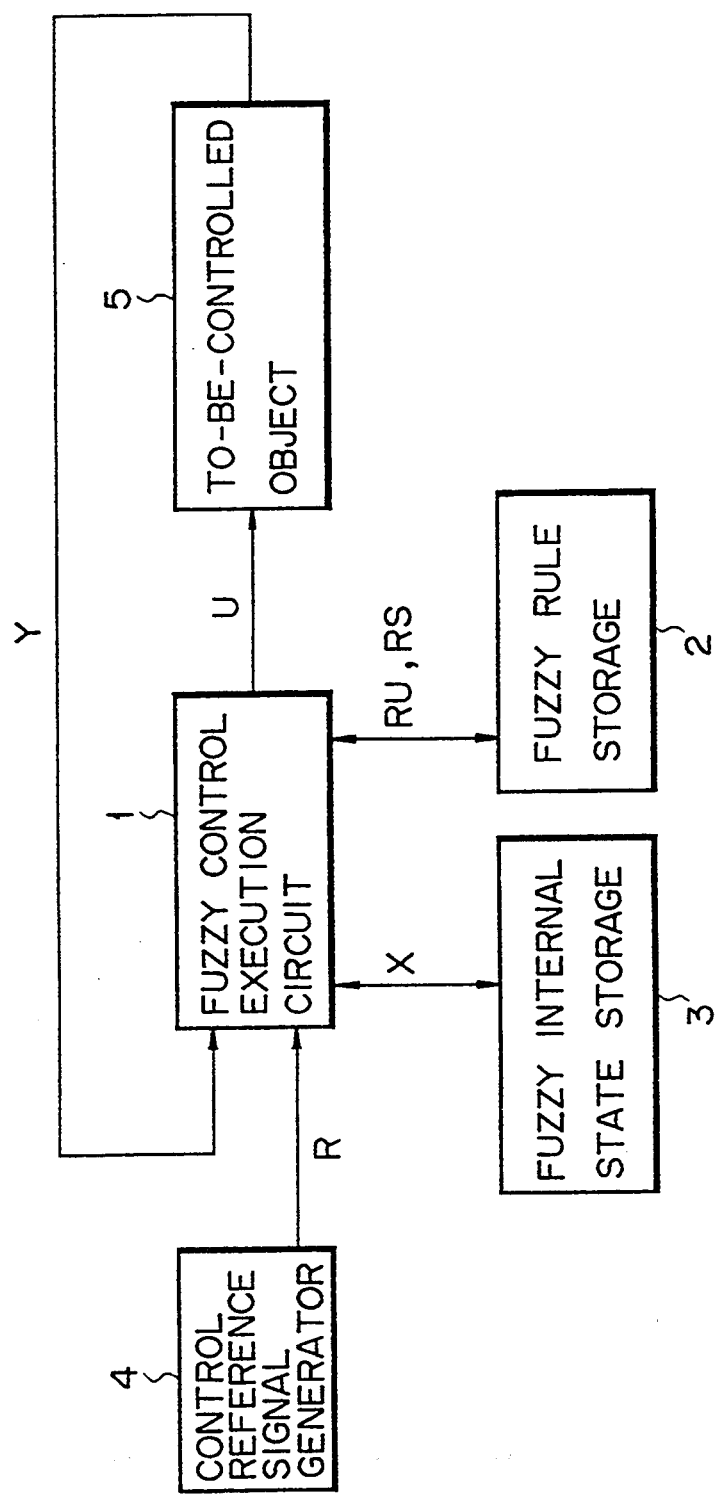
F I G. 1

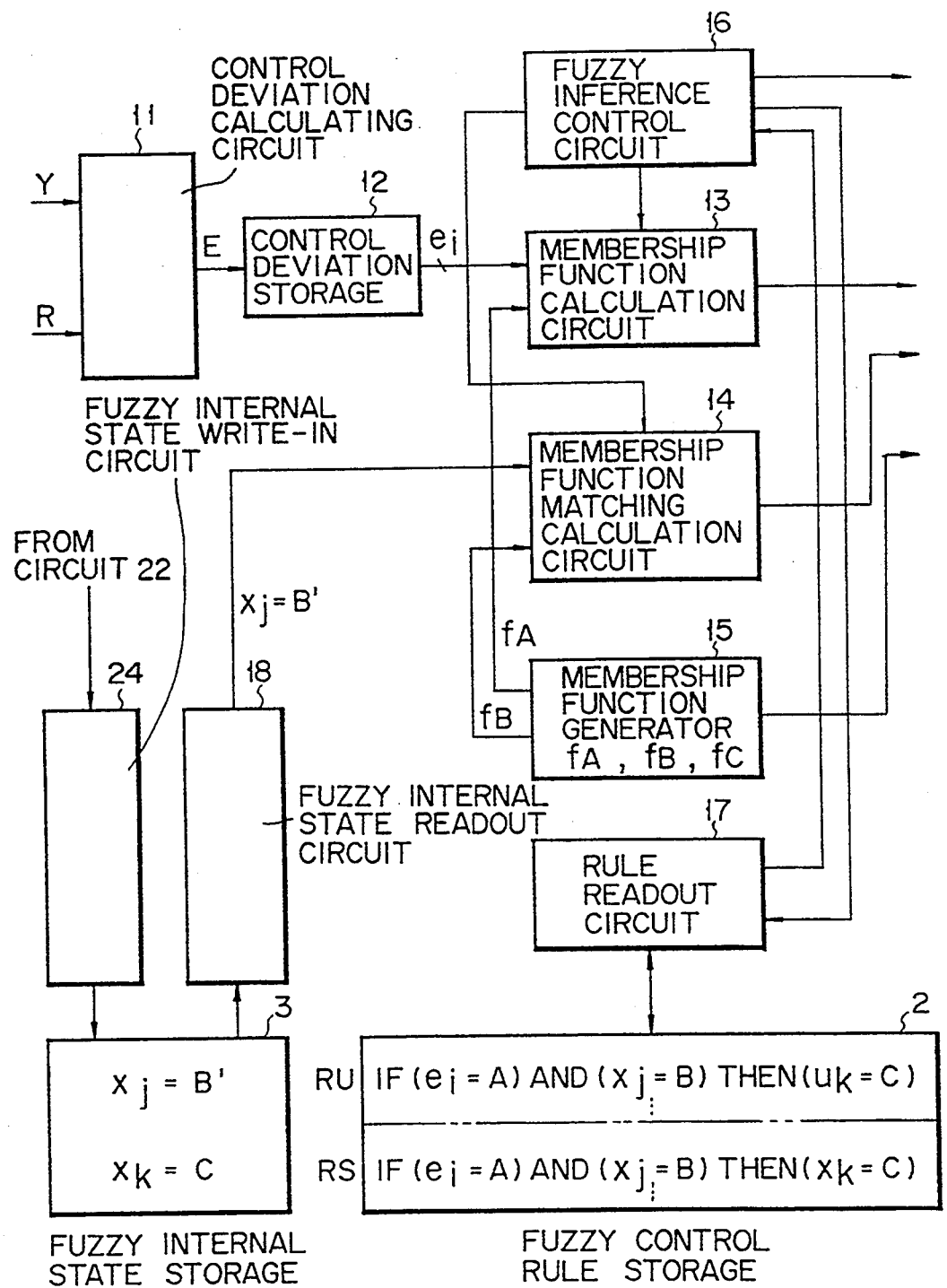
F I G. 2A

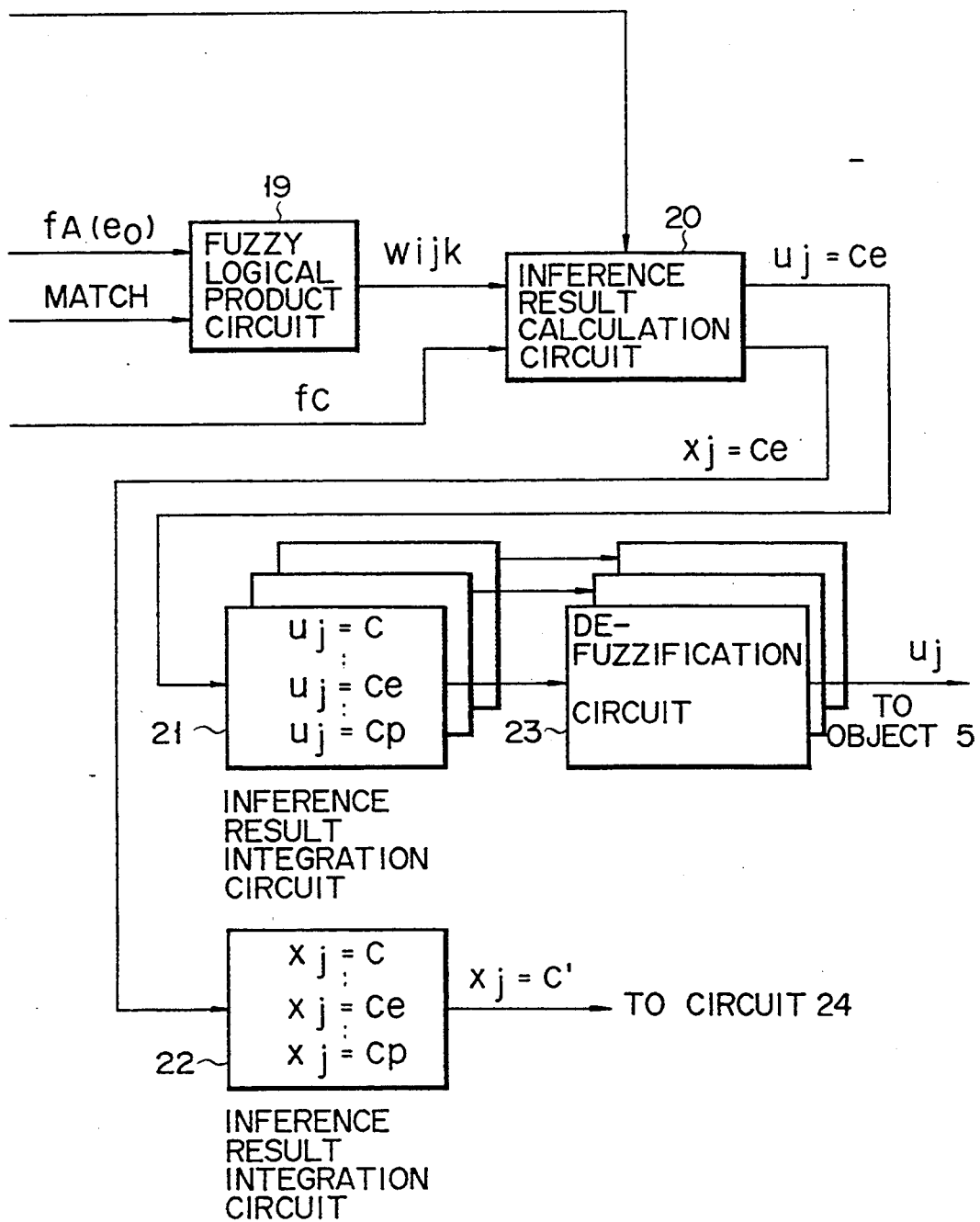
F I G. 2B

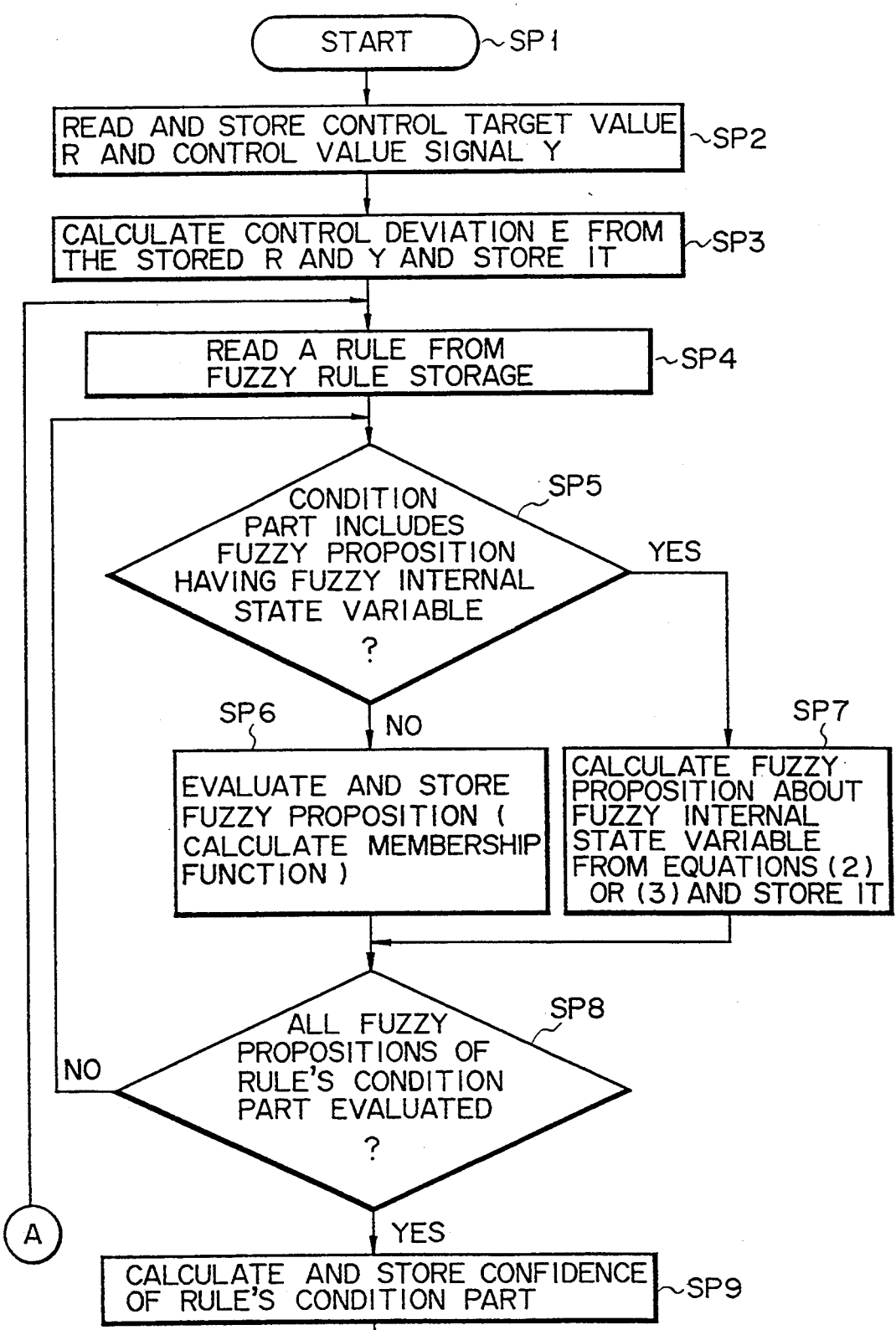
F I G. 3A

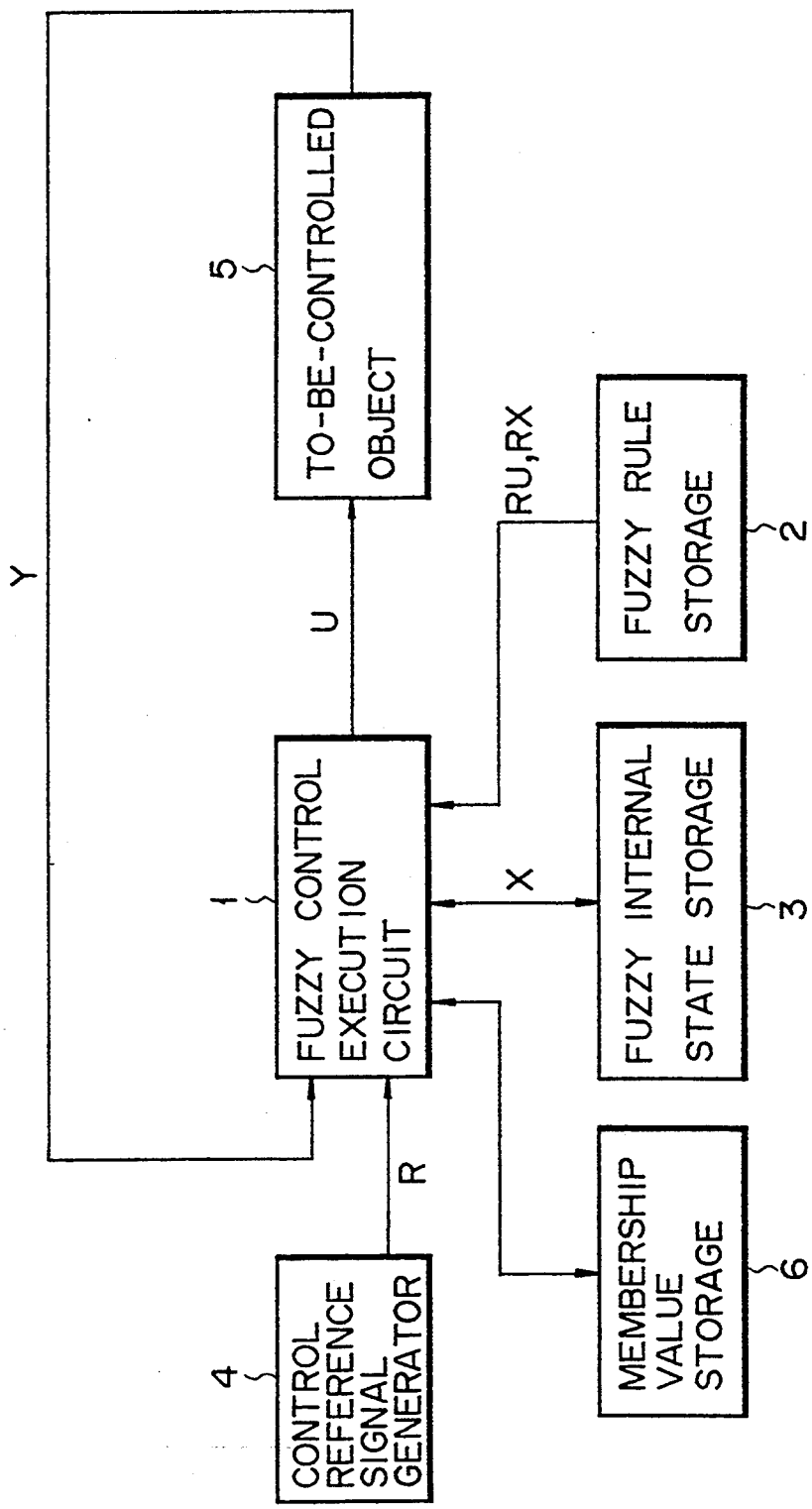
F I G. 4

FUZZY CONTROL SYSTEM

BACKGROUND OF THE INVENTION

1. Field of the Invention

The present invention relates to a fuzzy control system, a rule-based control system which controls a to-be-controlled object whose dynamic characteristics characteristic are not sufficiently understood or which vary during operation (e.g., a plant, robot, etc.), thus making the application of conventional theory difficult. The system uses control rules of a skilled operator or an expert.

2. Description of the Related Art

A fuzzy control system is a rule-based control system which is characterized by expressing control rules of an expert using a fuzzy theory and determining a control command by a fuzzy inference.

A conventional fuzzy control system performs control based on standardized control rules to directly acquire a control value from the status of a to-be-controlled object, so that an output identical to an input value is always produced. The conventional fuzzy control system cannot therefore achieve adaptive control which reflects an expert's global judgment on the status of a to-be-controlled object for determining a control command; for example, based on an object state judging rule such as "if the pressure is high and a change in water level is positive, the condition of the to-be-controlled object is not good" and a control rule such as "if the state of the to-be-controlled object is good and the pressure is high, then open a governing valve slightly." That is, conventionally, the high-grade or sensitive judging function of an expert cannot be reflected in the control of the to-be-controlled object.

SUMMARY OF THE INVENTION

It is therefore an object of the present invention to provide a fuzzy control system capable of performing adaptive control to reflect an expert's high-grade judging function to control a to-be-controlled object such as a plant or a robot.

To achieve this object, according to the present invention, there is provided a fuzzy control system and method for calculating a membership function concerning a control value of a to-be-controlled object through a fuzzy inference operation in accordance with an input value from the to-be-controlled object and a control rule, and determining the control value from the membership function to control the to-be-controlled object, which comprises the steps of storing a plurality of internal states respectively expressed by a plurality of membership functions in addition to the input value and the control value; determining a state of the to-be-controlled object using a rule for evaluating the input value; changing an internal state by fuzzy inference; storing a decision result as a new internal state; and determining a control value for the to-be-controlled object through fuzzy inference from the new internal state and the input value.

That is, the fuzzy control system embodying this invention has internal states expressed by membership functions in addition to an input value and a control value, and uses a rule for evaluating an internal state and input value when determining the state of the to-be-controlled object, and changes the internal state by 10 fuzzy inference. The result of the decision is stored as a new internal state, and then the control value of the to-be-controlled object from the new internal state and the input value is determined by fuzzy inference. More specifically, when performing fuzzy control of a to-be-controlled object, a fuzzy control execution circuit determines if the control of the to-be-controlled object is proper or not from a feedback signal from the to-be-controlled object and a control reference value, and when the decision is such that the control performance has dropped too low to control the to-be-controlled object with the available control knowledge, it stores the internal state of the to-be-controlled object at that time, i.e., the internal state is renewed. From the updated internal state and the input value, the control value of the to-be-controlled object will be determined by fuzzy inference. It is therefore possible to carry out adaptive control to reflect the high-grade judging function of an expert for controlling the to-be-controlled object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a control system to which a fuzzy control system embodying the present invention is applied;

FIGS. 2A and 2B show a circuit diagram of a fuzzy control execution circuit in FIG. 1;

FIGS. 3A and 3B show a flowchart illustrating a sequence of processes for fuzzy control which is executed by the circuits shown in FIGS. 1 and 2;

FIG. 4 is a block diagram of a fuzzy control system according to another embodiment of the present invention;

DETAILED DESCRIPTION OF THE PREFERRED EMBODIMENTS

Figure 3B:
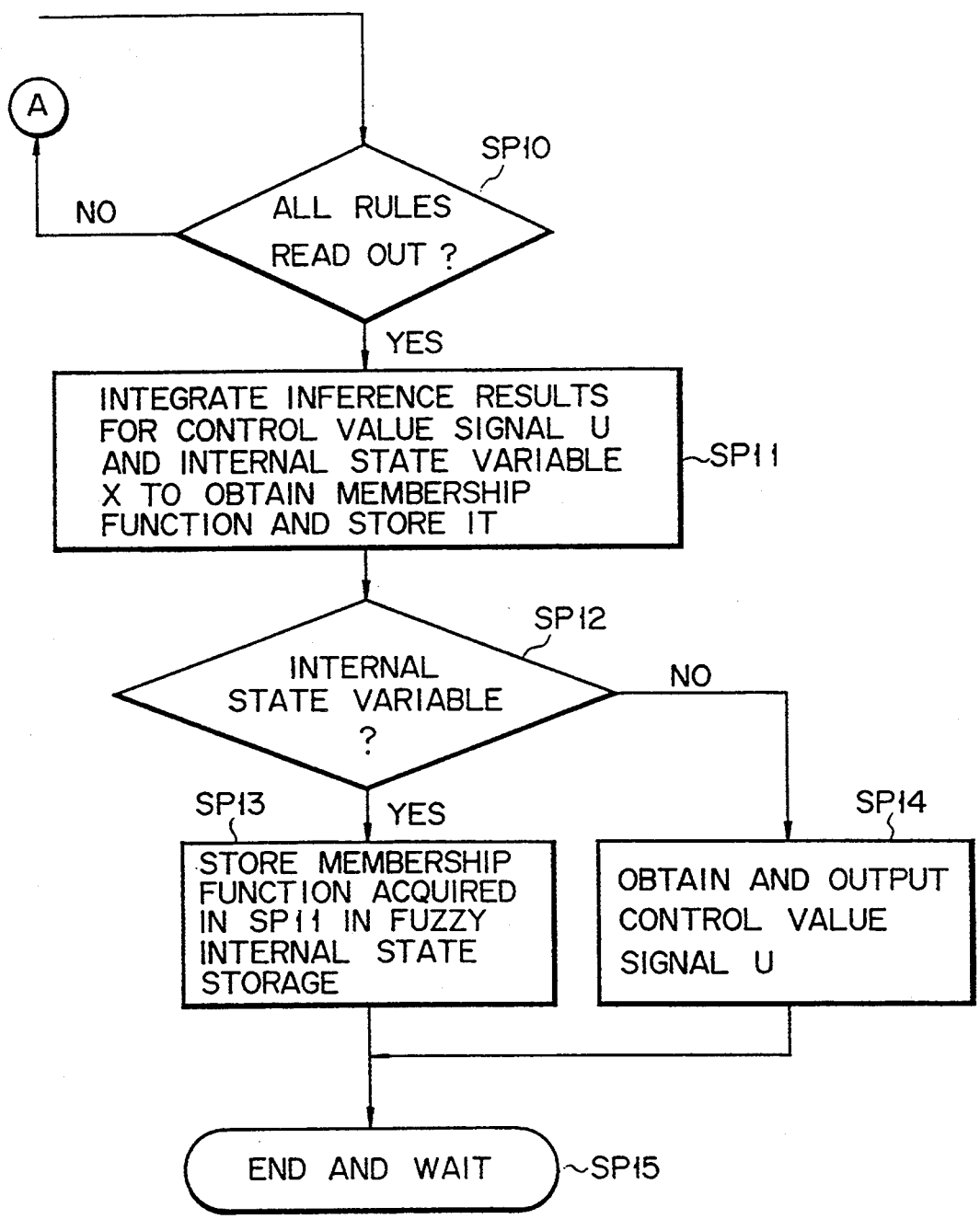

According to a fuzzy control system shown in FIG. 1, a fuzzy control execution circuit 1 is connected to a fuzzy rule storage 2 for storing a fuzzy control rule and a fuzzy state transition rule, a fuzzy internal state storage 3 for storing the current value of a fuzzy internal state as a membership function, and a control reference signal generator 4. The output port of the fuzzy control execution circuit 1 is connected to a to-be-controlled object 5, such as a plant or robot. The output of the to-be-controlled object 5 is fed back to the fuzzy control execution circuit 1.

The fuzzy control execution circuit 1 receives a control value signal Y from the to-be-controlled object 5 and a reference value signal R from the control reference target signal generator 4 for each control cycle, and outputs a control value signal U through fuzzy control. At this time, the fuzzy control execution circuit 1 reads out all the stored fuzzy control rules RU and fuzzy internal state transition rules RS from the fuzzy rule storage 2, reads out a fuzzy internal state X from the fuzzy internal state storage, and evaluates the rules. (If the evaluation of a control deviation E is necessary in the condition part, E=R−Y should be calculated in advance.) The fuzzy control rule RU and fuzzy internal state transition rule RS will be evaluated by a method discussed below.

With the to-be-controlled object having m inputs and n outputs, the individual signals U, Y, R and E at a time t are expressed by the following vectors.

Control value signal $U(t)=(u_1(t), u_2(t), \ldots, u_i(t), \ldots, u_m(t))^T$

Feedback control value signal $Y(t)=(y_1(t), y_2(t), \ldots, y_i(t), \ldots, y_n(t))^T$ Control reference signal $R(t)=(r_1(t), r_2(t), \ldots, r_i(t), \ldots, r_n(t))^T$ Control deviation $E(t)=(e_1(t), e_2(t), \ldots, e_i(t), \ldots, e_n(t))^T$ where $e_i(t)=r_i(t)-y_i(t)$.

Let us express a fuzzy internal state variable the fuzzy control system includes as follows.

Fuzzy internal state variable $X(t)=(x_1, x_2(t), \ldots, x_k(t))^T$.

The fuzzy internal state variable generally takes a fuzzy value or takes a membership function as a value. In some special cases, it may take a definite value. As a definite value can be treated as a special case of the fuzzy value, the following description will be given on the assumption that the fuzzy internal state variable takes a fuzzy value. A fuzzy control rule having a fuzzy internal state variable includes a fuzzy proposition concerning a fuzzy state variable in its condition portion, and has a fuzzy proposition concerning a control value in its conclusion part. An example of such a fuzzy control rule with a fuzzy internal state variable is presented below.

IF ($e_i$=A) and ($x_j$=B), then ($u_k$=C). where A, B and C are fuzzy values that are characterized by membership functions $f_A$, $f_B$ and $f_C$, respectively. When a control deviation $e_i(t)'$ is given at the current time t and a fuzzy internal state variable $x_j(t-1)$ then is B' (membership function $f_{B'}$), the confidence $W_{ijk}$ of the whole condition part of the above control rule may be computed as follows.

$$W_{ijk}=min\ (f_A(e_i(t)'),\ match\ (f_B(x_j), f_{B'}(x_j))) \quad (1)$$

where min ( ) indicates a fuzzy logical product (AND), and match ( ) indicates a calculation of matching between fuzzy internal state variables (membership functions). As the matching computation, the following are available.

$$match\ (f_B(x_j), f_{B'}(x_j))=max(min(f_B(x_j), f_{B'}(x_j))) \quad (2)$$

$$match\ (f_B(x_j), f_{B'}(x_j))=\int min((f_B(x_j), f_{B'}(x_j)))dx_j / \int (f_B(x_j))dx_j \quad (3)$$

When the confidence $W_{ijk}$ of the condition part of the rule is calculated, a fuzzy inference operation and a fuzzification operation for determining the control value are executed according to the algorithm in accordance with conventional fuzzy control.

This computation will be described more specifically. The above fuzzy control rule represents that the control value should be set to a fuzzy value C if the control deviation $e_i$=fuzzy value A at the time t and the fuzzy internal state variable $x_j$ (the internal state variable of the to-be-controlled object immediately before the time t)=fuzzy value B. In this case the degree of matching at the current time between the fuzzy internal state variables is calculated from either equation (2) or (3). From this matching degree and the fuzzy logical product, the confidence $W_{ijk}$ of the entire condition part of the control rule is computed from the equation (1). Based on this confidence $W_{ijk}$, the fuzzy inference operation and the control value will be determined.

A fuzzy internal state transition rule includes a fuzzy proposition concerning a fuzzy internal state variable in its condition part, and includes a fuzzy proposition concerning a fuzzy internal state in its conclusion part. An example of the fuzzy internal state transition rule is presented below.

IF ($e_i$=A) and ($x_j$=B), then ($x_k$=C). where A, B and C are fuzzy values that are characterized by membership functions $f_A$, $f_B$ and $f_C$, respectively. When a control deviation $e_i(t)'$ is given at the current time t and a fuzzy internal state variable $x_j(t-1)$ then is B' (membership function $f_{B'}$), this fuzzy internal state transition rule alters the state of the fuzzy state variable $x_k(t)$ at the time t. j=k means that the state of $x_j$ itself deviates.

The confidence $W_{ijk}$ of the whole condition part of the above rule will be computed according to the equation (1). A new state C' of $x_k$ at the time t according to this rule may be calculated as follows by conventional fuzzy inference. With $f_c'$ denoting a membership function representing C', then $f_c'(x_k)=W_{ijk} * f_c(x_k)$ or
$f_c'(x_k)=min\ (W_{ijk}, f_c(x_k))$.

The membership function which is the value of the fuzzy internal state variable may be stored in a pair with the associated confidence $W_{ijk}$, or the membership function may be sampled at a limited number of sample points of the internal state variable $x_k$ and the membership values at the sample points may be stored in a table.

The fuzzy control execution circuit 1 will now be described in detail referring to FIGS. 2A and 2B.

The fuzzy control execution circuit 1 has a control deviation calculating circuit 11 which receives the reference value R signal from the control reference signal generator and the feedback control value signal Y from the to-be-controlled object 5, and calculates the difference between the signals R and Y, i.e., the control deviation E. The output port of the control deviation calculating circuit 11 is connected to the write port of a control deviation storage 12 which stores the control deviation E. The read port of the control deviation storage 12 is connected to one of the input ports of a membership function calculating circuit 13. The other input port is connected to one of the output ports of a membership function generator 15, which has an output port connected to one input terminal of a membership function matching calculation circuit 14. The other input terminal of the membership function matching calculation circuit 14 is connected via a fuzzy internal state readout circuit 18 to a fuzzy internal state storage 3. The fuzzy internal state readout circuit 18 reads out a fuzzy internal state from the storage 3. The membership function calculation circuit 13 and the membership function matching calculation circuit 14 are connected to a fuzzy inference control circuit 16, which will control the circuits 13 and 14. The fuzzy inference control circuit 16 is connected to a rule readout circuit 17 which reads a fuzzy control rule from the fuzzy control rule storage 2. The fuzzy inference control circuit 16 transfers the fuzzy control rule, read from the fuzzy control rule storage 2 by the rule readout circuit 17, to the membership function matching calculation circuit 14.

The output ports of the membership function calculation circuit 13 and the membership function matching calculation circuit 14 are connected respectively to the first and second input ports of a fuzzy logical product circuit 19. The output ports of the fuzzy logical product circuit 19 and the membership function generator 15 are connected to the first and second input ports of an inference result calculation circuit 20, respectively. The inference result calculation circuit 20 has its first and the second output ports connected respectively to inference result integration circuits 21 and 22 which integrate inference results of the control value signal U and the internal state variable X. The output port of the inference result integration circuit 21 is connected to the input port of a defuzzification circuit 23 whose output port is connected to the to-be-controlled object 5. The inference result integration circuit 22 is connected to the fuzzy internal state storage 3 via a fuzzy internal state write-in circuit 24.

A sequence of processes of the above-described fuzzy control system will be explained below referring to a flowchart in FIGS. 3A and 3B. This flowchart shows processes to be executed at every sampling time in each sampling.

The process in step SP1 starts at a sampling time t, and then the process in step SP2 is executed. The control deviation calculating circuit 11 in the fuzzy control execution circuit 1 receives the reference value signal R from the control reference signal generator 4 and the feedback control value signal Y from the to-be-controlled object 5, and stores these signals. The control deviation calculating circuit 11 further calculates the control deviation E from the stored signals R and Y as needed, and sends the control deviation E to the control deviation storage 12 to store it there (step SP3).

The fuzzy inference control circuit 16 sends a fuzzy rule read command to the rule readout circuit 17. The rule read circuit 17 reads out the fuzzy control rule RU and the fuzzy internal state transition rule RS one after another from the fuzzy control rule storage 2, and transfers these rules to the fuzzy inference control circuit 16. The fuzzy inference control circuit 16 determines whether a fuzzy proposition about a fuzzy internal state variable $x_j$ is present in the condition parts of the received fuzzy control rule and fuzzy internal state transition rule (step SP5). If the condition parts of those rules do not include the fuzzy proposition relating to the fuzzy internal state variable $x_j$, the fuzzy inference control circuit 16 sends a control deviation $e_i$ of the condition parts of the rules to the membership function calculation circuit 13. The membership function calculation circuit 13 then evaluates a fuzzy proposition, based on the control deviation $e_i$ of the condition parts of the rules and the current control deviation $e_i$ from the control deviation storage 12. In other words, the membership function calculation circuit 13 calculates a membership function and stores the resultant value (step SP6).

If a fuzzy proposition about the fuzzy internal state variable $x_j$ is present in the rule, the fuzzy inference control circuit 16 supplies the fuzzy internal state variable $x_j$ to the membership function matching calculation circuit 14. Another fuzzy internal state variable $x_j$, read from the fuzzy internal state storage 3 by the fuzzy internal state readout circuit 18, is also sent to the membership function matching calculation circuit 14. Upon reception of the two variables $x_j$, the membership function matching calculation circuit 14 calculates matching between these variables. That is, the membership function matching calculation circuit 14 processes the fuzzy proposition based on the equation (2) or (3), or calculates the degree of matching between the fuzzy internal state variables, and stores the matching degree (step SP7).

The fuzzy inference control circuit 16 determines in step SP8 whether all the fuzzy propositions, $e_i$ and $x_j$, in the condition parts of the rules have been evaluated. When the judgment is affirmative (YES), the fuzzy inference control circuit 16 sends a control signal to the fuzzy logical product circuit 19. In accordance with the equation (1), the fuzzy logical product circuit 19 calculates the confidence $W_{ijk}$ of the condition part of each of the rules, and stores it (step SP9).

The fuzzy inference control circuit 16 determines in step SP10 whether or not all the rules have been read out and the condition parts of those rules have been evaluated. If an affirmative judgment is made, the fuzzy inference control circuit 16 sends a control signal to the inference result calculation circuit 20. Based on the confidence Wijk and the membership function $f_c$, the inference result calculation circuit 20 calculates the inference results $u_j$ and $x_j$ of the rules, and supplies them to the respective inference result integration circuits 21 and 22. The inference result integration circuits 21 and 22 respectively integrate the inference results $u_j$ and $x_j$ received from the inference result calculation circuit 20 by conventional fuzzy control means to provide the membership functions individually, and store them (step SP11). If the judgment in step SP10 is negative (NO), the flow returns to step SP4.

The inference result integration circuits 21 and 22 determine whether the signal output from the inference result calculation circuit 20 in step SP11 is a fuzzy internal state variable or control value signal (step SP12). When the output signal is a fuzzy internal state variable $x_j$, the membership function $x_j$ acquired by the inference result integration circuit 22 in step SP11 is stored in the fuzzy internal state storage 3 (step SP13). When the output signal is a control value signal $u_j$, the membership function $u_j$ acquired by the inference result integration circuit 21 in step SP11 is sent to the defuzzification circuit 23. This circuit 23 computes the control value from the membership function $u_j$ by conventional fuzzy control means, and outputs the control value signal $u_j$ to the to-be-controlled object 5 (step SP14).

In step SP15 the fuzzy inference control circuit 16 terminates the process at the sampling time t, and sets the processing in a wait state until the next sampling time t+1.

Through the above procedures, the fuzzy control apparatus is permitted to have the intrinsic state as a fuzzy internal state in itself, an expert's global discrimination result is stored as this internal state, and the internal state is changed according to rules to derive the decision. From this internal state and an input value, the control command is determined, thus realizing the fuzzy control which reflects the internal state or the stored global discrimination result on the control.

Referring to FIG. 4, an embodiment which has fuzzy temporal quantifiers added to the previous embodiment will now be described.

According to a fuzzy control system shown in FIG. 4, as in FIG. 1, a fuzzy control execution circuit 1 is connected to a fuzzy rule storage 2, a fuzzy internal state storage 3, and a control value signal generator 4. The output port of the fuzzy control execution circuit 1 is connected to a to-be-controlled object 5, such as a plant or robot. The output of the to-be-controlled object 5 is fed back to the fuzzy control execution circuit 1.

The fuzzy control execution circuit 1 receives a feedback control value signal Y from the to-be-controlled object 5 and a reference value signal R from the control target signal generator 4 for each control cycle, and outputs a control value signal U through fuzzy control. At this time, the fuzzy control execution circuit 1 reads out all the stored fuzzy control rules RU and fuzzy internal state transition rules RS from the fuzzy rule storage 2, reads out a fuzzy internal state X from the fuzzy internal state storage, and evaluates the rules. (If the evaluation of a control deviation E is necessary in the condition part, E=R−Y should be calculated in advance.) A membership value storage 6 is provided to store old fuzzy propositions modified by fuzzy temporal quantifiers.

The condition part of a rule including fuzzy temporal quantifiers will be evaluated by the following method.

With the to-be-controlled object having m inputs and n outputs, the individual signals U, Y, R, and E at a time t and a fuzzy internal state variable are expressed by the same vectors as used in the previous embodiment. The following is an example of a rule including fuzzy temporal quantifiers.

IF $(T(e_i=A))$ and $(x_j=B)$, then $(u_k=C)$. where A, B and C are fuzzy values that are characterized by membership functions $f_A$, $f_B$ and $f_C$, respectively, and T is a fuzzy temporal quantifier characterized by a membership function $f_T$. When control deviations $e_i(t)$ and $x_j(t)$ ($t \leq t_c$) are given at the current time t, a confidence g $((T(e_i=A)))$ of a fuzzy proposition including the fuzzy temporal quantifier T in the first term of the condition part of the above control rule will be computed as follows. Here $t_{max}$ represents the upper limit of the evaluation range of the fuzzy temporal quantifier T (the current time taken as the origin 0).

When the state of the to-be-controlled object has been realized at least once, or when T is a fuzzy temporal quantifier such as "about five minutes earlier," the confidence will be computed by the following equation (4).

$$g((T(e_i = A))) = \max_{t = 0, t_{max}} (\min(f_T(t), f_A(e_i(t_c - t)))) \quad (4)$$

When the state of the to-be-controlled object continues, or when T is a fuzzy temporal quantifier such as "from about five minutes," the confidence will be computed by the following equation (5).

$$g((T(e_i = A))) = \Sigma_{t = 0, t_{max}} (\min(f_T, f_A(e_i(t_c - t)))) / \Sigma f_T(t)$$
$$\quad (5)$$

$$t = 0, t_{max}(t)$$

The equations (4) and (5) are just examples and other equations may be used depending on the fuzzy temporal quantifiers.

As a fuzzy internal state variable takes a fuzzy value or takes a membership function as its value, the evaluation of the reference value signal to a fuzzy proposition about the fuzzy internal state variable needs matching between membership functions. More specifically, in the calculation of $g=((T(x_i=A)))$, if the value of the fuzzy internal state variable at the time t is $A'(f_A,(X_i(t)))$, the evaluation would be given as follows.

When the fuzzy internal state has been realized at least once, or when T is a fuzzy temporal quantifier such as "about five minutes earlier," the confidence g will be given by the following equation (4').

$$g((T(x_i = A))) = \max_{t = 0, t_{max}} (\min(f_T(t), \text{match} \quad (4')$$
$$(f_A(x_i(t_c - t)), f_{A'}(x_i(t_c - t)))))$$

When the fuzzy internal state continues, or when T is a fuzzy temporal quantifier such as "from about five minutes," the confidence g will be given by the following equation (5').

$$g((T(e_i = A))) = \Sigma(\min(f_T(t), \text{match} \quad (5')$$
$$t = 0, t_{max}$$
$$(f_A(x_i(t_c - t)), f_{A'}(x_i(t_c - t)))))/\Sigma f_T(t)$$
$$t = 0, t_{max}$$

With match ( ) expressing a matching calculation, the following computations may be available.

$$\text{match } (f_A(x_i), f_{A'}(x_i)) = \max(\min(f_A(x_i), f_{A'}(x_i)')) \quad (6)$$

$$\text{match } (f_A(x_i), f_{A'}(x_i)) = \int \min(f_A(x_i), f_{A'}(x_i)) dx_i / \int f_A(x_i) dx_i \quad (7)$$

When the confidence g of the fuzzy proposition including the fuzzy temporal quantifier is computed, a fuzzy logical operation, such as a logical product, and a fuzzy inference operation are executed according to conventional fuzzy control means.

Figure 5A:
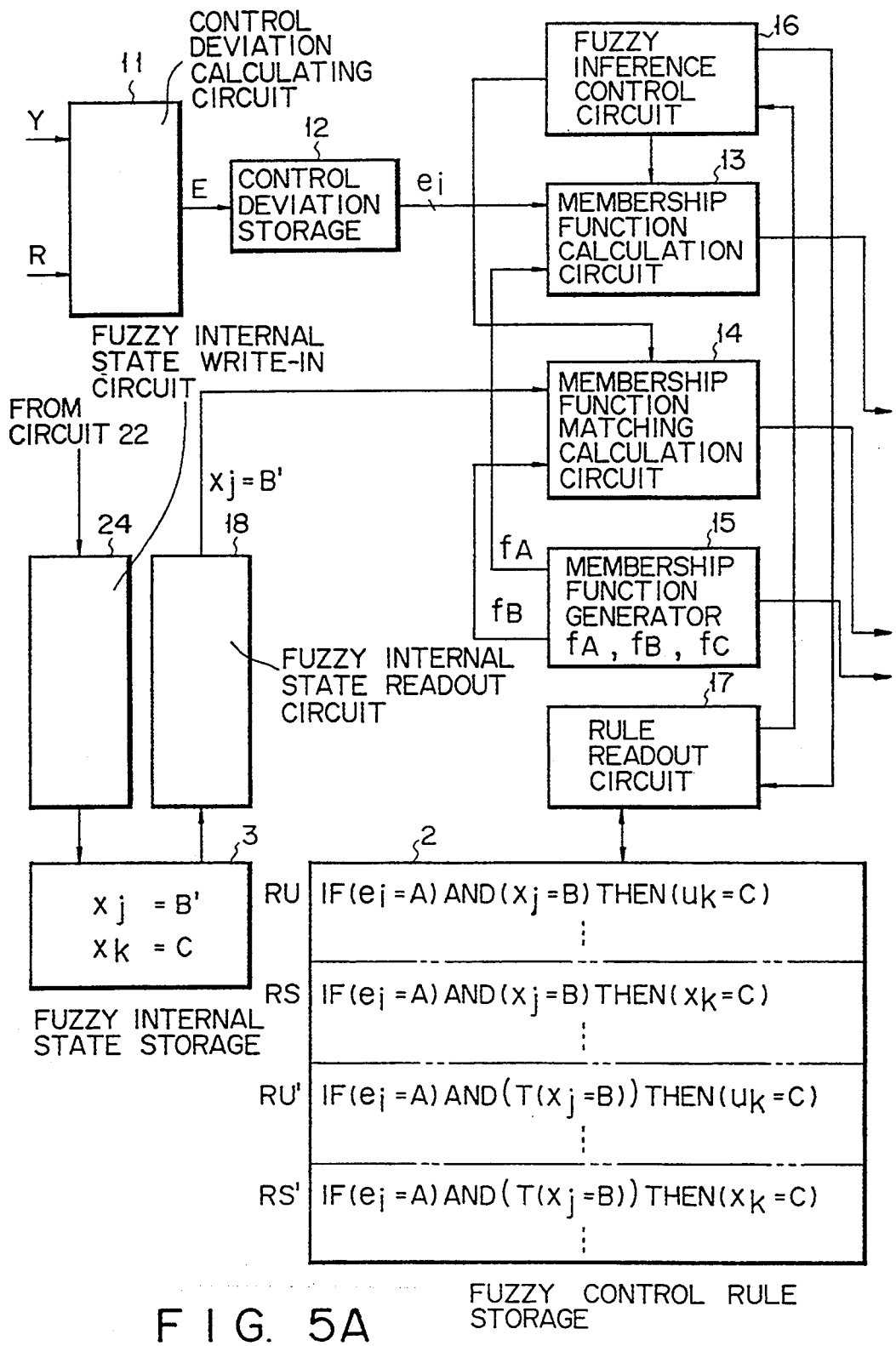
FIGS. 5A and 5B show a circuit diagram of a fuzzy control execution circuit in FIG. 4.
Figure 5B:
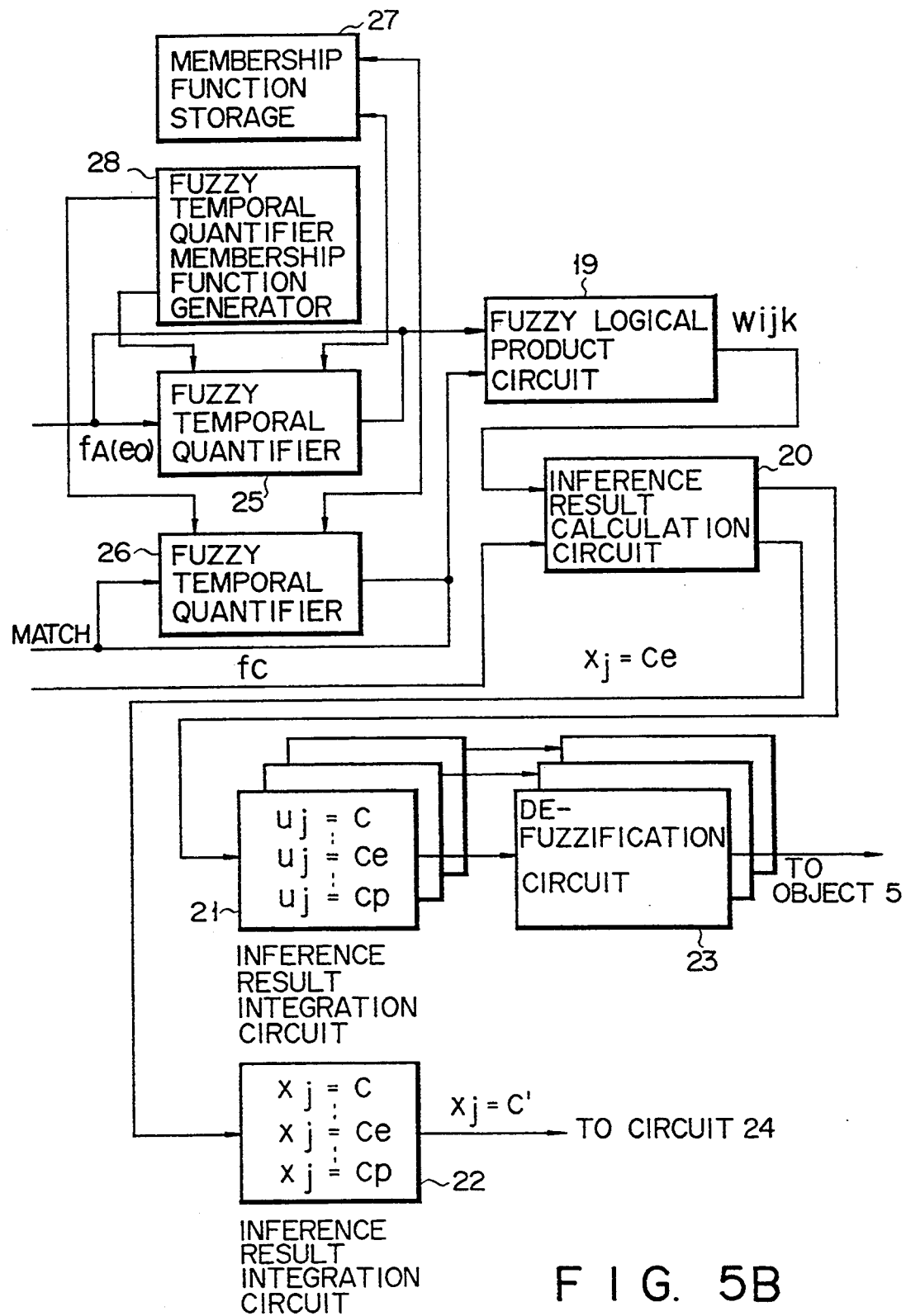

FIGS. 5A and 5B illustrate a block circuit of the fuzzy control execution circuit 1 including fuzzy temporal quantifiers.

In this fuzzy control execution circuit 1, fuzzy temporal quantifiers 25 and 26 are respectively connected between the membership function calculation circuits 13 and 14 and first and second input ports of a fuzzy logical product circuit 19. To both fuzzy temporal quantifiers 25 and 26 are connected a membership function storage 27 for storing a membership function about an old proposition and a fuzzy temporal quantifier membership function generator 28 for generating a fuzzy temporal quantifier membership function. In the fuzzy control rule storage 2 are stored a fuzzy control rule RU' including a fuzzy temporal quantifier and a fuzzy internal state transition rule RS' in addition to rules RU and RS. In this block circuit circuitry portions than the fuzzy temporal quantifiers 25 and 26 and their associated circuits are the same as in the block circuit in FIGS. 2A and 2B. The same or like reference numerals are therefore used in FIGS. 5A and 5B to denote identical or corresponding circuits to avoid repeating their description.

Figure 6A:
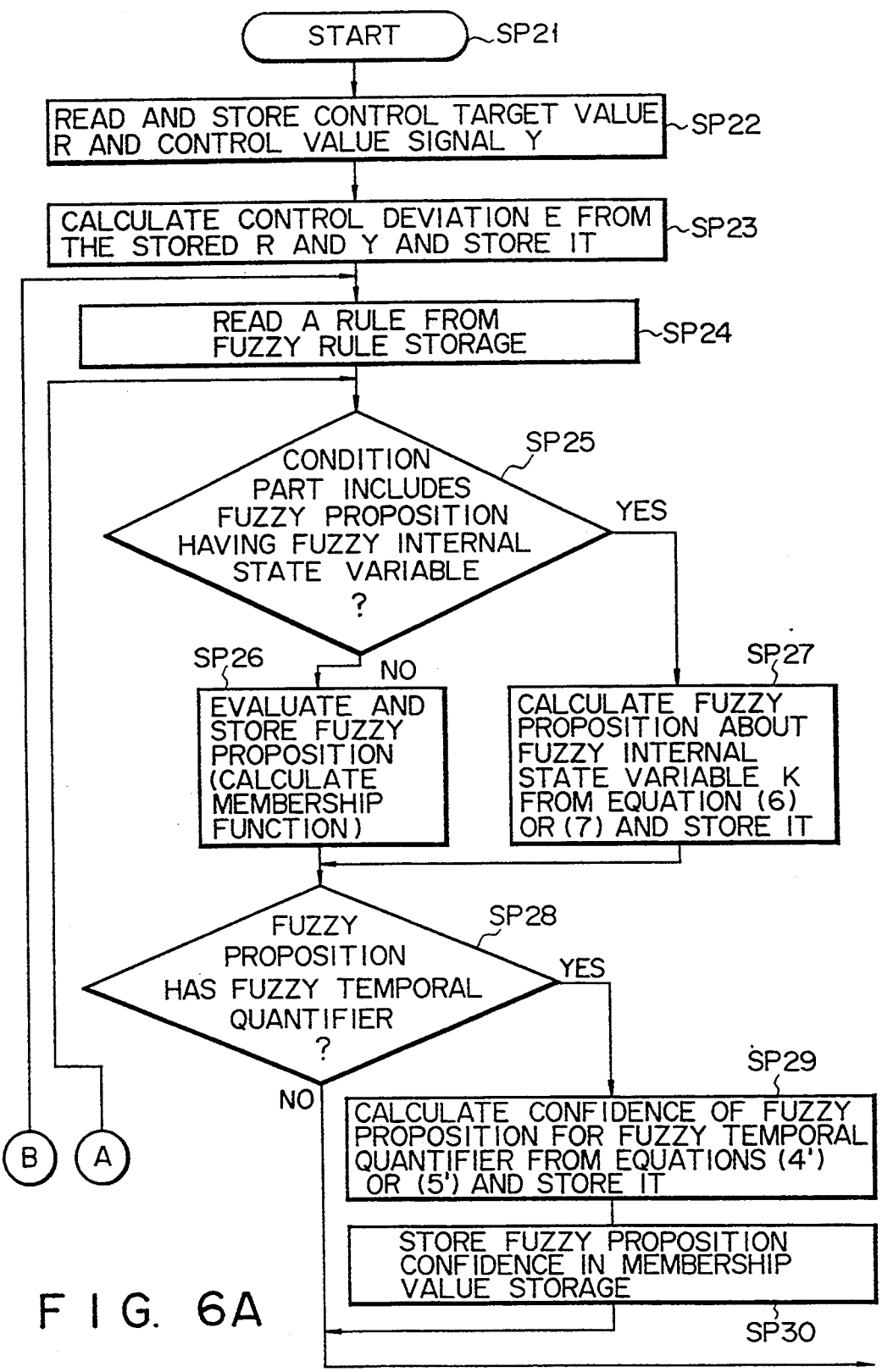
FIGS. 6A and 6B show a flowchart illustrating a sequence of processes for fuzzy control which is executed by the circuits shown in FIGS. 4 and 5.
Figure 6B:
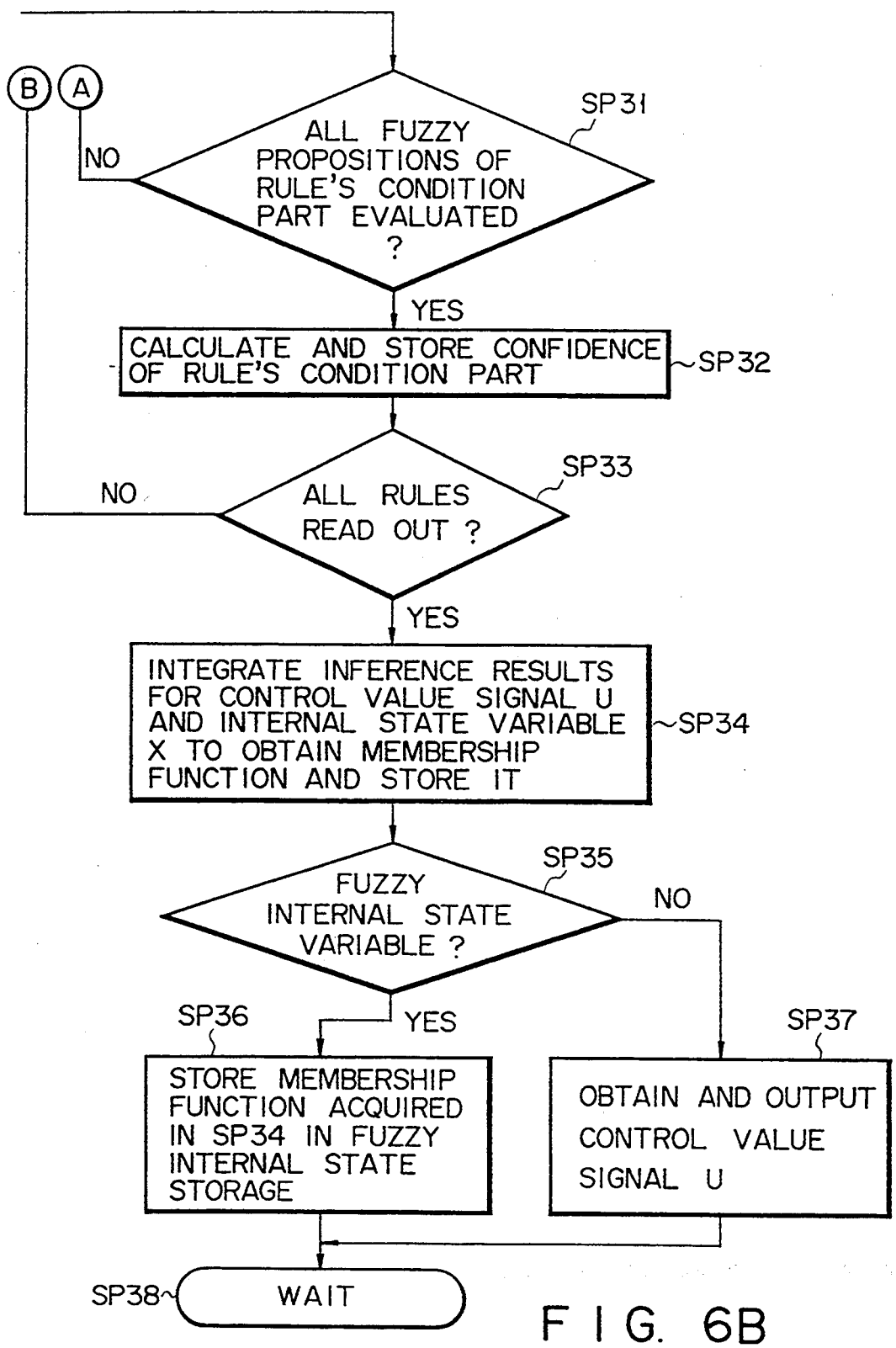

Referring to FIGS. 6A and 6B, the operation of the fuzzy control apparatus as shown in FIGS. 4, 5A, and 5B will be explained. In this embodiment the sequence of processes will be executed at every sampling time.

When the process starts at a sampling time t (step SP21), the control deviation calculating circuit 11 in the fuzzy control execution circuit 1 receives the reference value signal R from the control target signal generator 4 and the controlled amount signal Y from the to-be-controlled object 5, and stores these signals (step SP22). In the next step SP23 the control deviation calculating circuit 11 calculates the control deviation E from the stored signals R and Y as needed, and stores the control deviation E in the control deviation storage 12.

In step SP24 the fuzzy inference control circuit 16 sequentially reads out the fuzzy control rule RU and the fuzzy internal state transition rule RS as well as the fuzzy control rule RU′ and fuzzy internal state deviation rule RS′ from the fuzzy rule storage 2. In step SP25, the fuzzy inference control circuit 16 determines whether a fuzzy proposition about a fuzzy internal state variable $x_j$ is present in the condition parts of the received rules. If the condition parts of those rules do not include the fuzzy proposition concerning the fuzzy internal state variable $x_j$, the fuzzy inference control circuit 16 sends a control deviation $e_i$ of the condition parts of the rules to the membership function calculation circuit 13. The membership function calculation circuit 13 then evaluates a fuzzy proposition, based on the control deviation $e_i$ of the condition parts of the rules and the current control deviation $e_i$ from the control deviation storage 12. In other words, the fuzzy inference control circuit 16 calculates a membership function and stores the resultant value (step SP26). If a fuzzy proposition about the fuzzy internal state variable $x_j$ is present, on the other hand, the fuzzy inference control circuit 16 supplies the fuzzy internal state variable $x_j$ to the membership function matching calculation circuit 14. The membership function matching calculation circuit 14 also receives another fuzzy internal state variable $x_j$, read from the fuzzy internal state storage 3 by the fuzzy internal state readout circuit 18. Upon reception of the two variables $x_j$, the membership function matching calculation circuit 14 calculates matching between these variables. That is, the membership function matching calculation circuit 14 processes the fuzzy proposition based on the equation (6) or (7), or calculates the degree of matching between the fuzzy internal state variables, and stores the matching degree (step SP27).

In step SP28, the fuzzy inference control circuit 16 determines whether the evaluated fuzzy proposition has a fuzzy temporal quantifier, i.e., whether or not a fuzzy temporal quantifier is included in the condition part of the rule read out from the fuzzy control rule storage 2. When the fuzzy proposition does not have a fuzzy temporal quantifier, the flow advances to step SP31 and the same processing as done in the previous embodiment will be executed. When the fuzzy proposition has a fuzzy temporal quantifier, on the other hand, the fuzzy temporal quantifiers 25 and 26 calculate confidences (membership values) of the fuzzy proposition with the fuzzy temporal quantifier using the equation (4′) or (5′). In the computation of the fuzzy temporal quantifier, the fuzzy temporal quantifier 25 latches a fuzzy temporal quantifier membership function generated from the fuzzy temporal quantifier membership function generator 28 and reads out a membership function concerning an old proposition from the membership function storage 27. The fuzzy temporal quantifiers 25 and 26 compute the confidence of the fuzzy proposition from those membership functions and the signals input from the membership function calculation circuit 13 and membership function matching calculation circuit 14. Subsequently, the fuzzy temporal quantifiers 25 and 26 store the current confidence of the fuzzy proposition in the membership function storage 27 in step SP30.

In step SP31, the fuzzy inference control circuit 16 determines whether or not all the fuzzy propositions of the condition parts of those rules have been evaluated. If the decision is affirmative (YES), the fuzzy inference control circuit 16 sends a control signal to the fuzzy logical product circuit 19. The fuzzy logical product circuit 19 calculates the confidence $W_{ijk}$ of the whole condition parts of the rules according to the equation (1) and stores it (step SP32). If the decision in step SP31 is negative (NO), the flow returns to step SP25.

In step SP33 it is determined if the condition parts of all the rules have been evaluated. If the decision is affirmative, the fuzzy inference control circuit 16 sends a control signal to the inference result calculation circuit 20. Based on the confidence $W_{ijk}$ and the membership function $f_c$, the inference result calculation circuit 20 calculates the results of inference of the rules, $u_j$ and $x_j$, and supplies them to the respective inference result integration circuits 21 and 22. The inference result integration circuits 21 and 22 respectively integrate the inference results $u_j$ and $x_j$ received from the inference result calculation circuit 20 by conventional fuzzy control to acquire the membership functions, and store them (step SP34). If the judgment in step SP33 is negative, the flow returns to step SP24.

In step SP35, the inference result integration circuits 21 and 22 determine whether the output signal from the inference result calculation circuit 20 is a fuzzy internal state variable or control value signal.

When the output signal is a fuzzy internal state variable, the membership function acquired by the inference result integration circuit 22 in step SP34 is stored in the fuzzy internal state storage 3 via the fuzzy internal state write-in circuit 24 (step SP36).

When the output signal is a control value signal, the membership function $u_j$ acquired by the inference result integration circuit 21 in step SP34 is sent to the defuzzification circuit 23. This circuit 23 computes the control value from the membership function $u_j$ by conventional fuzzy control, and outputs the control value signal $u_j$ to the to-be-controlled object 5 (step SP37).

In step SP37 the fuzzy inference control circuit 16 terminates the process at the sampling time t, and sets the processing in a wait state until the next sampling time $t+1$.

The fuzzy control operation using the fuzzy temporal quantifier in the above embodiment will now be described referring to FIG. 7.

Figure 7:
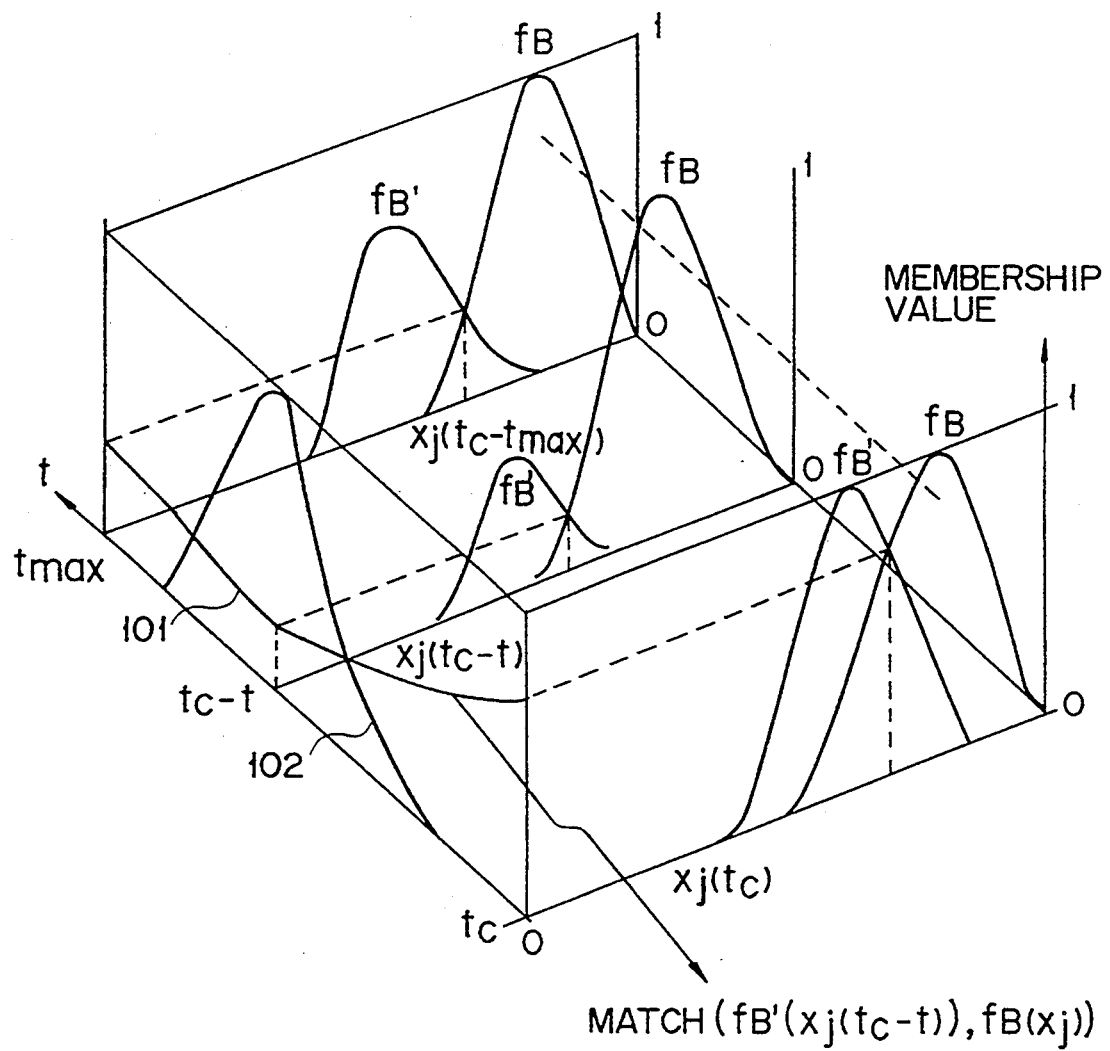
FIG. 7 is a diagram for explaining a fuzzy control including fuzzy temporal quantifiers.

A curve 101 in FIG. 7 represents a membership function to be stored in the membership function storage 27, and it is formed by connecting the matching point between the membership value $f_B$ of the rule and the membership value $f_B'$ at the current time $t_c$, the matching point between the membership value $f_B$ and the membership value $f_B'$ at an old time $t_{c-t}$, and the matching point between the membership value $f_B$ and the membership value $f_B'$ at the oldest time $t_{max}$. A curve 102 represents a membership function of the fuzzy temporal quantifier and is output from the fuzzy temporal quantifier membership function generator 28. In case of equation (4'), the highest membership value of that portion where the region formed by the function curve 101 and the region formed by the function curve 102 overlap each other, is output to the logical product circuit 19 as the result of the computation done by the fuzzy temporal quantifiers 25 and 26.

Figure 8:
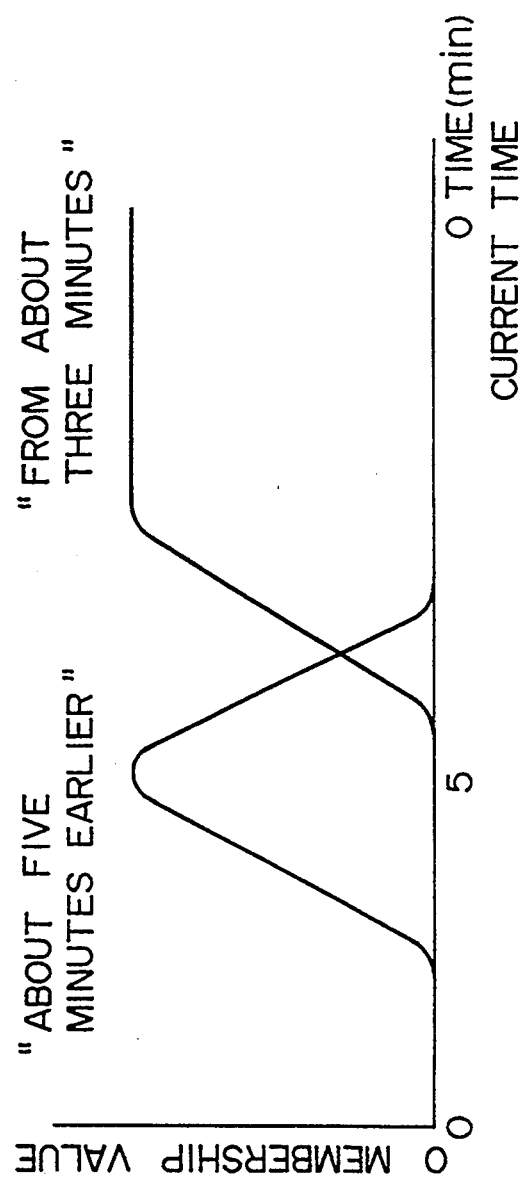
FIG. 8 is a diagram for explaining a concrete example of a fuzzy control including fuzzy temporal quantifiers.

A specific example of the fuzzy temporal quantifier is shown in FIG. 8. For instance, when a control rule such that "if the pressure about five minutes earlier is high, then slightly open the valve" is read out from the fuzzy control rule storage 2, the fuzzy temporal quantifier of "about five minutes earlier" in FIG. 8, output from the fuzzy temporal quantifier membership function generator 28, is used and the previous value of the confidence (membership value) of the proposition about the process state of "the pressure is high", which is stored in the membership function storage 27, is processed by the fuzzy temporal quantifier 25 and 26, to obtain the current confidence by which the condition part of this rule is established. The control command at the current time will then be determined based on the acquired confidence.

In short, the fuzzy control system embodying the present invention can permit an experts high-grade decision function for a to-be-controlled object to be reflected in the fuzzy control. Further, the decision result is stored as the internal state of the fuzzy control apparatus and the stored internal state is used to achieve fuzzy control which has a flexibility in its application to control rules. Accordingly, the high-grade decision function of an expert can be realized, thus widening the field of application of the fuzzy control system.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A fuzzy control system for controlling a physical object, the physical object being responsive to a control signal and producing a status signal corresponding to the status of the physical object, the fuzzy control system comprising:

means for receiving the status signal from the physical object;

means for generating a control reference value;

means for selectively calculating a control deviation from the received status signal and the control reference value;

operation means, connected to said selective calculating means, for performing a fuzzy inference operation on the control deviation calculated by said selective calculating means and a control deviation contained in a fuzzy rule, the fuzzy rule defined by expert knowledge, to obtain a control deviation membership function;

calculating means for calculating matching between a membership function about an internal state of said physical object and a membership function about an internal state variable included in said fuzzy rule to obtain a matching point, and calculating a membership function about the control signal for said physical object and a membership function about a new internal state variable from an internal state variable membership value corresponding to the matching point;

means for storing the membership function about said new internal state variable;

and means for outputting said control signal to said physical object and controlling the physical object.

2. A fuzzy control system according to claim 1, further comprising means for determining whether or not said fuzzy rule has a fuzzy temporal quantifier, and fuzzy temporal quantifier means for calculating a confidence of a fuzzy proposition in response to a decision by said determining means that said fuzzy rule has a fuzzy temporal quantifier, and outputting a calculation result to said calculating means.

3. A fuzzy control system according to claim 1, which includes storage means for storing the fuzzy rule including a plurality of fuzzy control rules and a plurality of fuzzy state transition rules, and wherein said operation means includes means for reading out the fuzzy control rules and the fuzzy state transition rules one by one from said storage means, and means for executing the fuzzy inference operation in accordance with each of the fuzzy control rules and the fuzzy state transition rules.

4. A fuzzy control system according to claim 1, wherein said calculating means calculates said matching according to one of the following equations:

$$\text{match } (f_B(X_j), f_{B'}(X_j)) = \max \left( \min \left( f_B(X_j), f_{B'}(X_j) \right) \right) \quad (1)$$

$$\text{match } (f_B(X_j)) = \int \min((f_B(X_j), f_{B'}(X_j)) dx_j / \int f_B(X_j) dx_j) \quad (2)$$

where $f_B$ represents a membership function of a fuzzy value of a variable contained in said fuzzy rule, $f_{B'}$ represents a membership function of a fuzzy value of said internal state, and $x_j$ represents an internal state variable.

5. A fuzzy control system for controlling a physical object, the physical object responsive to a control signal and producing a feedback signal, the fuzzy control system comprising:

means for receiving the feedback signal from the physical object;

control target signal generating means for generating a control target signal;

control deviation means for acquiring a control deviation from said control target signal from said control target signal generating means and the feedback signal from said physical object;

first storage means for storing a plurality of fuzzy rules about fuzzy control, the fuzzy rules defined by expert knowledge regarding the physical object;

second storage means for storing an internal state of said physical object;

first calculating means for calculating a membership function of said control deviation in accordance with said fuzzy rules sequentially read out from said first storage means;

second calculating means for calculating matching between internal state variables included in said fuzzy rules and said internal state read out from said second storage means;

third calculating means for computing a confidence from said control deviation membership function acquired by said first calculating means and an internal state membership function corresponding to a matching value;

means for calculating an inference result from said confidence and a control value membership function, and calculating the control signal from said inference result; and means for outputting said control signal and controlling said physical object.

6. A method for controlling a physical object by generating a control value through a fuzzy inference operation in accordance with an input value from said physical object and a control rule defined by expert knowledge, the control value determined from a membership function to control said physical object, the method comprising the steps of:

preparing a plurality of internal states concerning a condition of said physical object, said internal states respectively expressed by a plurality of membership functions;

monitoring the input value from said physical object;

determining a state of said physical object using the control rule defined by expert knowledge, the control rule for evaluating the input value;

changing an internal state by fuzzy inference;

storing a decision result as a new internal state;

determining the control value for said physical object through fuzzy inference from said new internal state and said input value; and controlling said physical object using said control value.

7. A system for controlling a physical object, the physical object being responsive to a control signal and producing a status signal corresponding to the status of the physical object, the system comprising:

means for receiving the status signal from the physical object;

means for storing an existing state concerning an inferred condition of the physical object;

first fuzzy inference means, responsive to the status signal, a fuzzy state transition rule for determining a new state, and the existing state, for determining a new state concerning the physical object using a fuzzy inference operation;

means for storing the new state;

second fuzzy inference means, responsive to the status signal, a fuzzy control rule for determining a control value, and the new state, for determining a control value for the physical object using a fuzzy inference operation; and control means, responsive to the control value, for producing the control signal and controlling the physical object.

8. The system of claim 7, wherein the existing state and the new state are each expressed as a membership function.

9. The system of claim 7, wherein the fuzzy control rule comprises a fuzzy proposition concerning the new state in a condition part, and a fuzzy proposition concerning the control value in a conclusion part.

10. The system of claim 9, wherein the fuzzy state transition rule comprises a fuzzy proposition concerning the existing state in a condition part, and a fuzzy proposition concerning the new state in a conclusion part.

11. The system of claim 10, wherein the physical object comprises a robot.

12. The system of claim 10, wherein the physical object comprises a plant having a valve controlled by the control means.

13. The system of claim 10, further comprising:

a control reference value generator for generating a reference signal corresponding to desired behavior of the physical object;

a control deviation calculating circuit, responsive to the reference signal and to the status signal, for calculating a control deviation; and confidence evaluation means, responsive to the control deviation calculating circuit, for evaluating a confidence level of the control value, wherein the second fuzzy inference means is further responsive to the confidence level.

14. The system of claim 13, wherein the status signal comprises a plurality of outputs, each output being produced as a function of time, the control signal comprises a plurality of inputs to the physical object, each input being produced as a function of time, and the control reference signal comprises a plurality of reference values, each reference value being generated as a function of time.

* * * * *